United States Patent [19]

Wodeslavsky

[11] Patent Number: 5,566,028
[45] Date of Patent: Oct. 15, 1996

[54] VACUUM CONTROLLED SIDE-REAR VIEW MIRROR FOR EXPOSING BLIND SPOT

[76] Inventor: Josef Wodeslavsky, #5 Peter Lynas Ct., Tenafly, N.J. 07670

[21] Appl. No.: 305,379

[22] Filed: Sep. 13, 1994

[51] Int. Cl.⁶ .............................. G02B 7/182; G02B 5/08
[52] U.S. Cl. ........................ 359/871; 359/878; 359/850; 359/843
[58] Field of Search ................... 359/871, 878, 359/872, 874, 877, 850, 843

[56] References Cited

U.S. PATENT DOCUMENTS

| | | | |
|---|---|---|---|
| 3,416,854 | 12/1968 | Fyker | 359/878 |
| 3,624,818 | 11/1971 | Stanfield | 359/878 |
| 3,650,607 | 3/1972 | Rogers et al. | 359/878 |
| 3,825,324 | 7/1974 | Brewington | 359/878 |
| 5,159,497 | 10/1992 | Lynar | 359/877 |

Primary Examiner—Paul M. Dzierzynski
Assistant Examiner—Mohammad Y. Sikder

[57] ABSTRACT

An apparatus, which exposes the blind spot in the direction in which a vehicle makes a turn, to be installed at the back of mechanically or electrically operated side-rear view mirrors. A mechanical device, connected to a mirror unit and to the frame, having a diaphragm sealingly disposed therein. When a winker switch is activated, the diaphragm housing is activated by vacuum, causing the diaphragm to be sucked backwards, resulting in said mirror unit pivoting backwards to expose the blind spot, further, when there is no vacuum the mirror unit is returned to its original position by the returning means. The invention also operates where instead of one mirror, there are two mirrors hinged together, whereby the mechanical device pivots only one of the mirrors to expose the blind spot, such that the other mirror is left to expose the rear-view of the car. The invention can also operate by pivoting the mirror frame to expose the blind spot rather than pivoting the mirror unit.

7 Claims, 4 Drawing Sheets

VACUUM CONTROLLED SIDE-REAR VIEW MIRROR FOR EXPOSING BLIND SPOT

BACKGROUND OF THE INVENTION

This invention relates to devices which shift the side-rear view mirror in cars in order to expose dead spots. More particularly, this device relates to a novel side-rear view mirror which is capable of being pivoted to expose the blind spot by the use of the engine's vacuum.

Although rear-view mirror pivoting apparatus such as disclosed in U.S. Pat. No. 4,938,577 exist, such devices are actuated by electric motors which have multiple deficits. First, since the mirror is controlled by a motor, an inherent problem is the long adjustment period necessary for pivoting the mirror. The long period necessary for an eclectic motor to move the mirror is seen when one adjusts the side-view mirrors at the onset of driving. Such a delay between the activation of the apparatus and the response of the mirror to the point where the blind spot is exposed could be critical if the driver seeks to make an emergency turn to the next lane. Such a delay could also be a nuisance, or annoyance given that quicker response is available. Second, electric motors can not return the mirror to its exact original position, without the presence of a memory controller—which is expensive. Third, since electrical failure is very common, such devices are prone to fail and are therefore less reliable then mechanically activated devices. Fourth, devices requiring a motor are more expensive then mechanically activated devices.

It is thus desirable to provide a cheap, reliable mechanically activated rear-view mirror for exposing blind spots where one can expose the blind spot quickly upon command and be able to have the mirror return to its exact original position.

OBJECT AND SUMMARY OF THE INVENTION

The main object of the present invention is the provision of a novel, cheaper, more reliable pivoting rear-view mirror for exposing blind spots capable of quick respond to command and able to return to its preexisting initial position. Upon activation, the mirror will be temporarily pivoted away from its normal adjusted position to expose the blind spot. The activator can be the winker switch. At the activation of the winker switch, the mirror will move to expose the blind spot at which point the driver could turn the steering wheel to turn the car—if no car is present in the blind spot.

This invention consists of a diaphragm housing installed at the back of the mirror. A connecting rod is connects a diaphragm within the diaphragm housing and at its other end, the rod is pivotally connected to the back of the mirror. The diaphragm housing is connected to a vented valve housing which provides for selective communication between the vacuum in the manifold and the diaphragm housing. Upon activation of the winker switch, vacuum from the manifold will permeate the diaphragm housing, causing the diaphragm to drag the rod which will pivot the mirror to expose the blind spot. After a pre set time, a timer will prevent further vacuum from permeating the diaphragm housing, but will allow atmospheric air to permeate from the vented valve housing to the diaphragm housing.

DETAILED DESCRIPTION OF THE INVENTION

Figure 1:
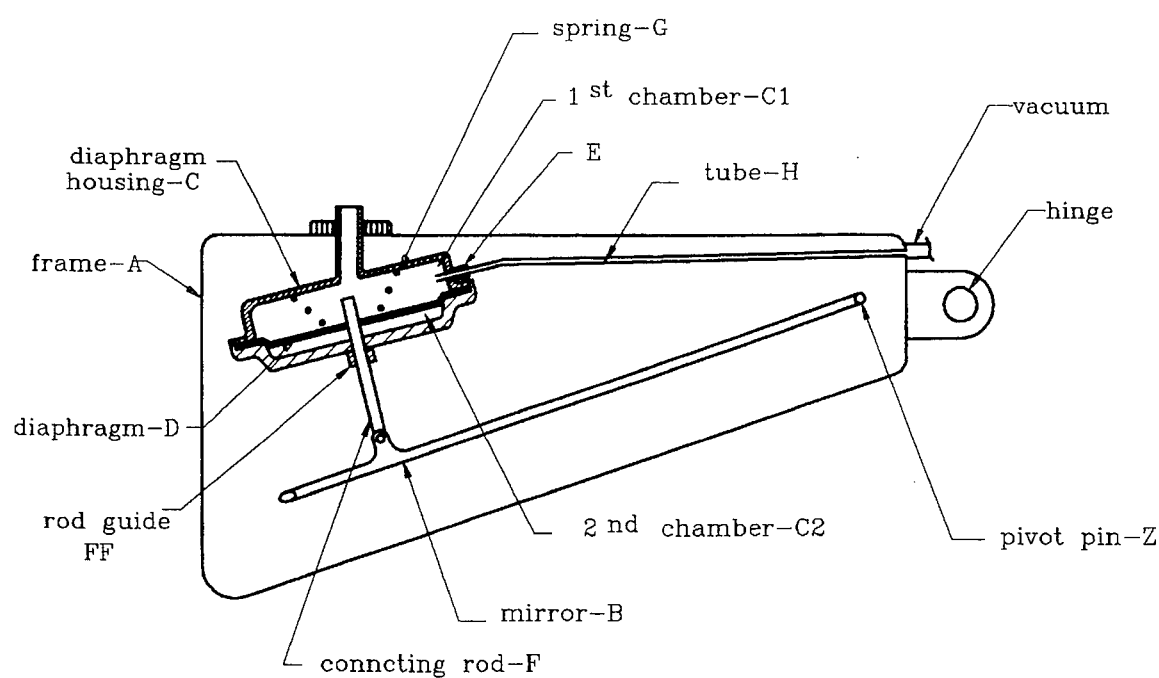
FIG. 1 will illustrate the diaphragm housing connected behind the mirror.

FIG. 1 illustrates the invention consisting of a mirror frame A installed behind the mirror B, the frame A having a diaphragm housing C mounted on it. The diaphragm housing has two chambers, C1 and C2 and a dividing diaphragm D. The diaphragm housing comprises an inlet E in first chamber C1, and a spring G disposed in first chamber C1 urges the diaphragm D towards the mirror B, holding the mirror B in its set position. Second chamber C2 comprises a rod guide FF facing mirror B and a rod F protruding from rod guide FF in the direction of mirror B. The first end portion of the rod F is sealingly connected to the diaphragm D and the second end portion of the rod F is pivotally mounted to the back of the mirror B.

Figure 2:
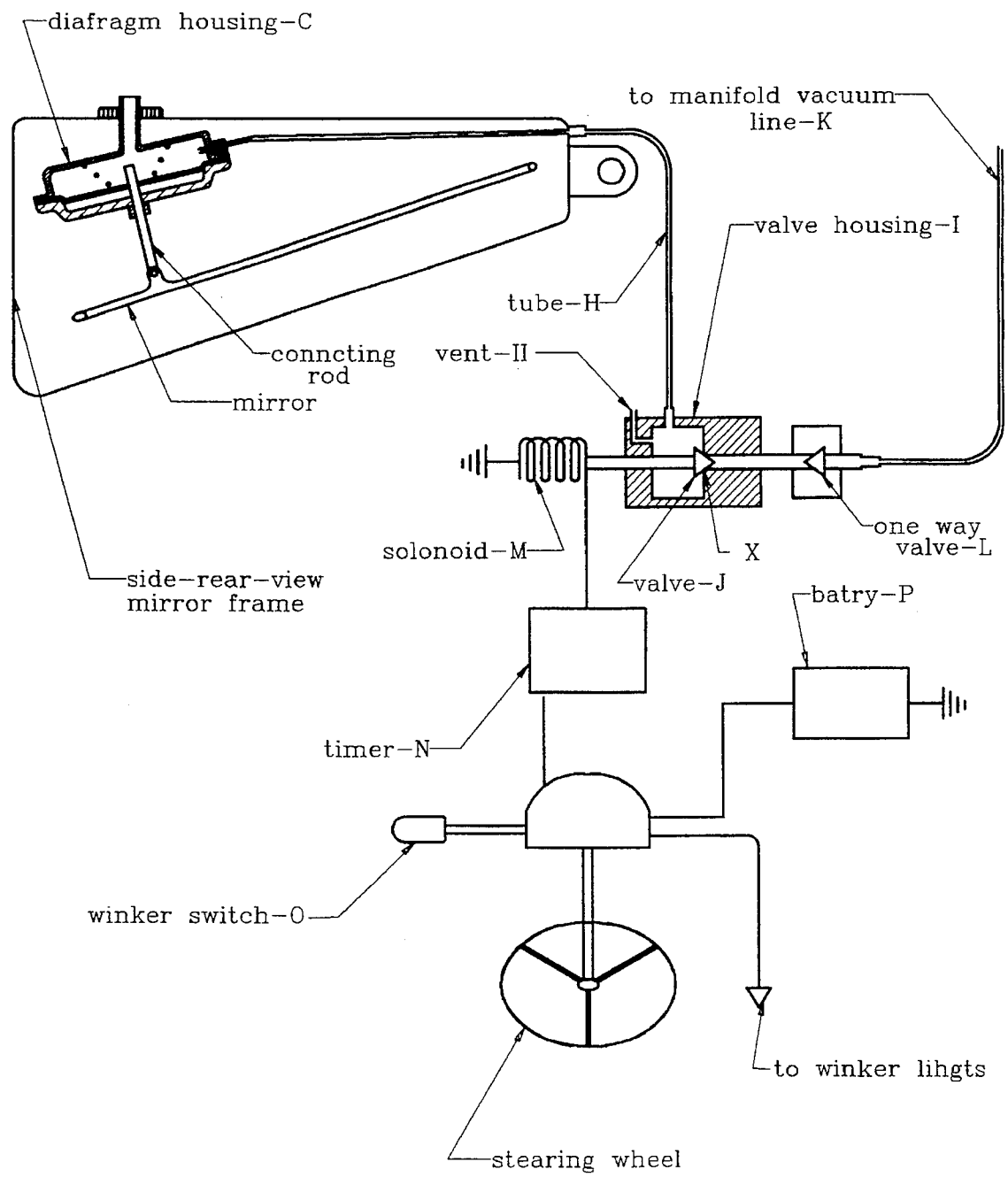
FIG. 2 will illustrate the interconnections of the apparatus in a vehicle.

As shown in FIG. 2, inlet E of first chamber C1 is adapted via a tube H to a valve housing I having a restricted vent II and a valve J therein. The restricted vent will allow a small amount of atmospheric air to enter into the valve housing I. This insignificant amount of atmospheric air will not significantly reduce the vacuum in the valve housing I, and the diaphragm housing C, so long as the valve J is open. Yet, the restricted vent will be large enough to allow enough atmospheric air to enter the valve housing I quickly enough when the valve J is closed, so that the diaphragm could return to its original position after the particular pre set time. Vented valve housing I having an inlet adapted to be connected to the vacuum line K leading to the manifold, and an outlet adapted to be connected to tube H leading to the inlet of first chamber C1 in the diaphragm housing C. Valve J in valve housing I, normally seated on seat X sealing the inlet of the valve housing, controls the vacuum inlet of the diaphragm housing C, allowing selective communication between the vacuum in the manifold and the diaphragm housing C. Valve J, prevents the suction in the motor from creating a vacuum in diaphragm housing C, whenever the valve is in closed position. A one way valve L is disposed within vacuum line K to keep vacuum in the vacuum line and therefore in diaphragm housing C, in case the vacuum disappears or reduces in the manifold. A vacuum tank can be disposed between one way valve L and valve housing I, to provide vacuum if the pressure in the manifold rises. Valve J is controlled by a solenoid M which is controlled by a timer N which is enabled by the winker switch O which is connected to battery P. Winker switch O controls the electrical power supply to timer N.

Upon activation of the winker switch O, power from battery P will be supplied to timer N. In turn, timer N will send an electric pulse to solenoid M, causing valve J to be pulled away from seat X, momentarily allowing vacuum to permeate from the manifold vacuum line K through the valve housing I via tube H into chamber C1. This sudden valve movement, causing the permeation of vacuum into chamber C1 of the diaphragm housing C will expose diaphragm D to vacuum. As the suction will overcome the force of spring G, the suction will cause a momentary suction of the diaphragm away from mirror B. This diaphragm movement will drag rod F which will drag mirror B backwards, away from its pre set position—exposing the blind spot to the driver. Since the valve housing is vented by vent II, the inlet line of diaphragm housing C will gradually fill with atmospheric air. When the force of spring G will overcome the suction force on diaphragm D, the spring will push diaphragm D forwards toward mirror B. Diaphragm D will drag rod F forward, which in turn will allow mirror B to pivot to its exact original pre set position. The following will decide the rate at which the mirror will resume its original position: the vent opening II, the surface area of diaphragm D exposed to vacuum, the force of spring G. Instead of spring G, a spring capable of returning the mirror to its original position could be located outside of the diaphragm housing, between the diaphragm housing and the mirror.

One type of timer could provide the following: so long as winker switch O is on, timer N will activate solenoid M every pre set seconds, to allow vacuum to reach diaphragm D so that the driver can repeatedly monitor the blind spot alternately, for example, viewing the blind spot then normal view, then a pre set time later again viewing the blind spot then normal view, then a pre set time again viewing the blind spot then normal view etc., until the winker switch will be turned off. This result could be provided without a timer at all. The solenoid could be directly activated by the winker switch, wherein the winker switch will provide the solenoid with a pulsating signal. In order to allow the diaphragm to return to its original position within a pre set time other than the time interval between winker signals, the vent size could be set to a size to achieve a slower or faster pivots of the mirror, exposing the blind spot every pre set time.

Another type of timer could receive pulsating voltage from the winker switch and transmit DC voltage to the solenoid. This will allow the mirror to be held backwards to expose the blind spot so long as the winker switch is turned on.

Instead of any timer, other electrical means that achieve the same result could be provided to send the appropriate signal to the solenoid.

Figure 3:
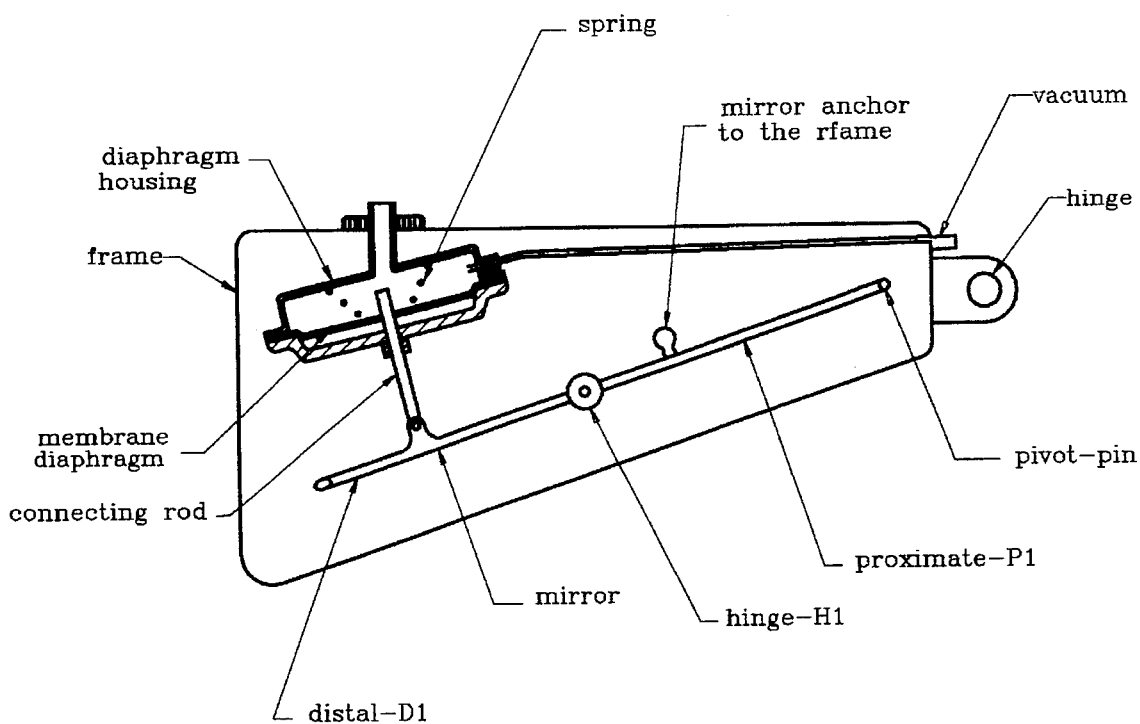
FIG. 3 will illustrate the diaphragm housing controlling only the distal part of a two piece mirror FIG. 4 will illustrate the interconnection between the rod and the mirror being controlled by an electric motor.

FIG. 3 illustrates the diaphragm housing where the mirror is composed of two parts: a proximate portion P1 adjacent to the body of the vehicle, and a distal portion D1, distant from the body of the vehicle. The distal and proximate portions are connected via a hinge H1. The diaphragm housing is pivotally connected to the distal portion of the mirror. When the winker switch will be activated, only distal portion D1 of the mirror will be pivoted backwards to expose the blind spot. This configuration allows the driver to simultaneously observe the blind spot in the distal portion of the mirror and the pre set rear-view in the proximate portion of the mirror.

In vehicles where the whole frame can be mechanically pivoted for adjustment, the diaphragm housing can be externally pivotally connected to the frame and anchored straight to the vehicle. When the winker switch will be moved, the rod will pivot backwards the frame, consequently drawing the mirror backwards. In this case the spring could be disposed outside of the diaphragm housing, such that it will return the whole frame to its original position, rather than returning the diaphragm to its original position.

Figure 4:
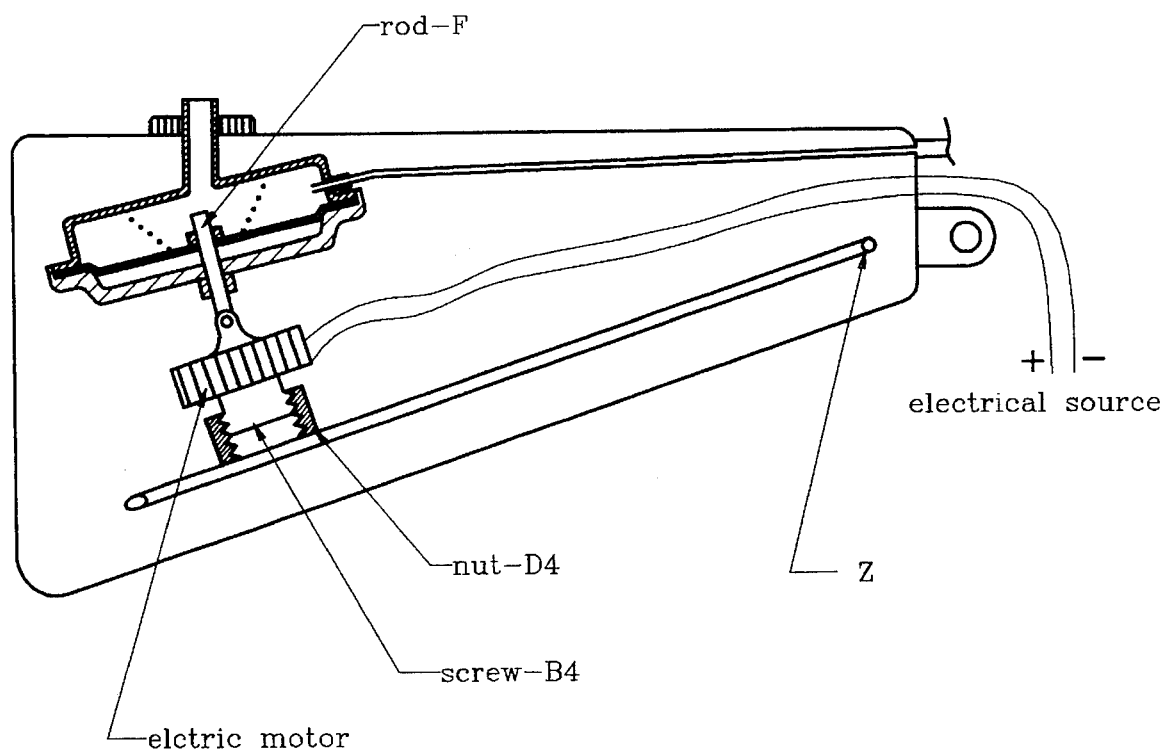

FIG. 4 illustrates the device installed in mirror frames designed to house an electric motor A4 for the purpose of setting the mirror. In case an electric motor exists, the motor will be connected to rod F via pivot pin C4. The electric motor comprises a screw B4. Attached to the back of mirror B is a nut D4. When the screw is screwed into the nut, the distance between the mirror and the rod will be shortened, causing the mirror to pivot backwards on the pivot point of pivot Z. When the screw is screwed out of the nut, the distance between the mirror and the rod will elongate, allowing the mirror to move forward. When the winker switch is activated the rod will be dragged backwards, pulling with it the motor, which in turn will pull the mirror. The motor is not used at all for the purpose of exposing the blind spot, therefore the process of exposing the blind spot is not retarded by any electrical motors. The motor's purpose is purely conventional—setting the mirror. Similarly, the device can be installed in mirror frames housing two motors—one providing a means to pivot the mirror around a horizontal axis, and the other providing a means to pivot the mirror around a vertical axis. In such a set up the diaphragm housing can be incorporated to provide a means to expose the blind spot. When the winker switch is activated, the rod will be dragged backwards, pulling with it the motors, which in turn will pull the mirror. Both motors serve the purely conventional function of setting the mirrors, the motors play no part in exposing the blind spot. Therefore, the device can mechanically expose the blind spot in electrically activated mirrors as well as in mechanically activated mirrors.

I claim:

1. A vacuum controlled rear-view mirror for viewing a blind spot existing in the direction in which a vehicle makes a turn, comprising:

a mirror frame mounted on a vehicle body;

a mirror means for viewing selected views pivotally connected to said frame;

a manifold vacuum line having a one way valve disposed therein to maintain a vacuum in said line whenever such vacuum drops in said manifold;

a diaphragm housing mounted to the frame, the diaphragm housing having a diaphragm sealingly disposed therein to define a first and a second chamber,
   the first chamber adjacent to said frame having an inlet,
   the second chamber having,
      a rod guide facing the back of said mirror means,
      a connecting rod having one end sealingly connected to said diaphragm, a body protruding from said rod guide and a second end mounted to the back of said mirror means;

a spring means for returning the mirror means to its original position;

a tube having a first end adapted to be connected to said inlet in the first chamber;

a vented valve housing having
      an inlet, comprising a valve seat, said inlet adapted to be connected to the manifold vacuum line,
      an outlet adapted to be connected to a second end of said tube,
      a valve seated in the valve seat for providing selective communication between said manifold vacuum line and said diaphragm housing;

a solenoid actuated by a signal from a winker switch, so that upon the solenoid activation, the valve in said valve housing moves away from the seat allowing the suction in the manifold vacuum line to create a vacuum in the valve housing which in turn creates a vacuum in the first chamber of said diaphragm housing, causing the diaphragm to be sucked away from the mirror means against the opposing force of the spring, dragging said connecting rod which pivots the mirror means to expose the blind spot, further, when the winker switch is turned off, the mirror means returns to its original position as vented air permeates the tube allowing the force of the spring to return the mirror forward to its original position.

2. A vacuum controlled rear-view mirror for viewing a blind spot existing in the direction in which a vehicle makes a turn, comprising:

a mirror frame pivotally mounted on a vehicle body;

a mirror means for viewing selected views connected to said frame;

a manifold vacuum line having a one way valve disposed therein to maintain a vacuum in said line whenever such vacuum drops in said manifold;

a diaphragm housing mounted to the back of said frame and anchored to said vehicle, the diaphragm housing having a diaphragm sealingly disposed therein to define a first and a second chamber, the first chamber adjacent to said frame having an inlet, the second chamber having, an rod guide facing the back of said frame;

a connecting rod having one end sealingly connected to said diaphragm, a body protruding from said guide and a second end mounted to the back of said frame;

a spring means for returning the frame to its original position;

a tube having a first end adapted to be connected to said inlet in the first chamber;

a vented valve housing having an inlet, comprising a valve seat, said inlet adapted to be connected to the manifold vacuum line, an outlet adapted to be connected to a second end of said tube, a valve seated in the valve seat for providing selective communication between said manifold vacuum line and said diaphragm housing;

a solenoid actuated by a signal from a winker switch, so that upon the solenoid activation, the valve in said valve housing moves away from the seat allowing the suction in the manifold vacuum line to create a vacuum in the valve housing which in turn creates a vacuum in the first chamber of said diaphragm housing, causing the diaphragm to be sucked away from the mirror means against the opposing force of the spring, dragging said connecting rod which pivots the mirror means to expose the blind spot, further, when the winker switch is turned off, the mirror means returns to its original position as vented air permeates the tube allowing the force of the spring to returns the frame forward to its original position.

3. A vacuum controlled rear-view mirror, as in claim 1 or 2, further comprising:

an electrical means, supplied by power form the battery, for providing the solenoid a DC voltage upon receiving a pulsating signal from the winker switch.

4. A vacuum controlled rear-view mirror, as in claim 1 or 2, further comprising:

an electrical means, supplied by power from the battery, for suppling the solenoid pulsating signals of a first pre-set frequency upon receiving a pulsating signal of a second pre-set frequency from the winker switch;

whereby, when the winker switch is turned on, a pulse generated by the electrical means causes the solenoid to pull the valve in said valve housing away from the seat for a pre-set time corresponding to the first pre-set frequency, and then the solenoid causes the valve to return to the seat at the end of the pulse, whereby during the interval when the valve is away from its seat, the suction in the manifold vacuum line to create a vacuum in the valve housing which in turn creates a vacuum in the first chamber of said diaphragm housing, causing the diaphragm to be sucked away from the frame against an opposing force of the spring, dragging said connecting rod which pivots the frame to expose the blind spot, further, between pulses, the mirror frame returns to its original position as vented air permeates the tube allowing the force of the spring to push the diaphragm forward to its original position, this process repeats itself with each winker pulse, so long as the winker switch is on.

5. A vacuum controlled rear-view mirror as in claim 1 or 2 wherein said mirror means comprises a single mirror.

6. A vacuum controlled rear-view mirror as in claim 1 or 2 wherein said mirror means comprises two mirrors, a proximate mirror adjacent to the vehicle and a distal mirror away from the vehicle, said mirrors are connected by a hinge, said connecting rod second end being connected to one of the mirrors, whereby upon activation or the winker switch said connecting rod pivots said connected mirror on said hinge to expose the blind spot to the driver.

7. A vacuum controlled rear-view mirror as in claim 1 or 2, the mirror means comprising at least one electric motor for adjusting the mirror.

* * * * *